US007203687B2

(12) United States Patent
Adiba et al.

(10) Patent No.: US 7,203,687 B2
(45) Date of Patent: Apr. 10, 2007

(54) PEER-TO-PEER REPLICATION MEMBER INITIALIZATION AND DEACTIVATION

(75) Inventors: Nicolas G. Adiba, San Jose, CA (US); Jaime F. Anaya, San Jose, CA (US); Elizabeth B. Hamel, Morgan Hill, CA (US); Yat On Lau, San Jose, CA (US); Siqun Li, San Jose, CA (US); Bruce G. Lindsay, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 10/789,656

(22) Filed: Feb. 26, 2004

(65) Prior Publication Data

US 2005/0193037 A1    Sep. 1, 2005

(51) Int. Cl.
*G06F 17/00* (2006.01)
*G06F 7/00* (2006.01)

(52) U.S. Cl. ............... 707/100; 707/202; 707/204; 709/201

(58) Field of Classification Search ............... 707/3–4, 707/8–10, 100–102, 201–204; 709/201, 709/204, 205, 220; 711/25, 141, 161–162
See application file for complete search history.

(56) References Cited

U.S. PATENT DOCUMENTS

| 5,832,514 | A | 11/1998 | Norin et al. |
| 5,991,768 | A | 11/1999 | Sun et al. |
| 6,029,178 | A * | 2/2000 | Martin et al. ............... 707/201 |
| 6,092,220 | A | 7/2000 | Palmer et al. |
| 6,122,630 | A * | 9/2000 | Strickler et al. ............... 707/8 |
| 6,202,149 | B1 | 3/2001 | Hedegard |
| 6,301,589 | B1 * | 10/2001 | Hirashima et al. .......... 707/204 |
| 6,412,017 | B1 * | 6/2002 | Straube et al. ............. 719/313 |
| 6,446,144 | B1 * | 9/2002 | Habusha et al. ............. 710/29 |
| 6,615,223 | B1 | 9/2003 | Shih et al. |
| 6,973,463 | B2 * | 12/2005 | Merrells et al. ............ 707/201 |
| 6,973,464 | B1 * | 12/2005 | Gao ........................... 707/201 |
| 7,069,295 | B2 * | 6/2006 | Sutherland et al. ......... 709/203 |
| 7,072,911 | B1 * | 7/2006 | Doman et al. .............. 707/201 |
| 7,085,764 | B2 * | 8/2006 | Bangel et al. ................ 707/10 |
| 2002/0188624 | A1 | 12/2002 | Landin |
| 2003/0154238 | A1 | 8/2003 | Murphy et al. |
| 2003/0188035 | A1 | 10/2003 | Lubbers et al. |

* cited by examiner

*Primary Examiner*—Greta Robinson
*Assistant Examiner*—Jacques Veillard
(74) *Attorney, Agent, or Firm*—Sawyer Law Group LLP

(57) ABSTRACT

A method and system for member initialization to and deactivation from an asynchronous data replication group in a database system is disclosed. The method and system allows new members to be added to the replication group or existing members to be removed from the replication group, without requiring the halting of the asynchronous replication of data. The performance advantages of asynchronous replication are still realized during member initialization or deactivation.

32 Claims, 11 Drawing Sheets

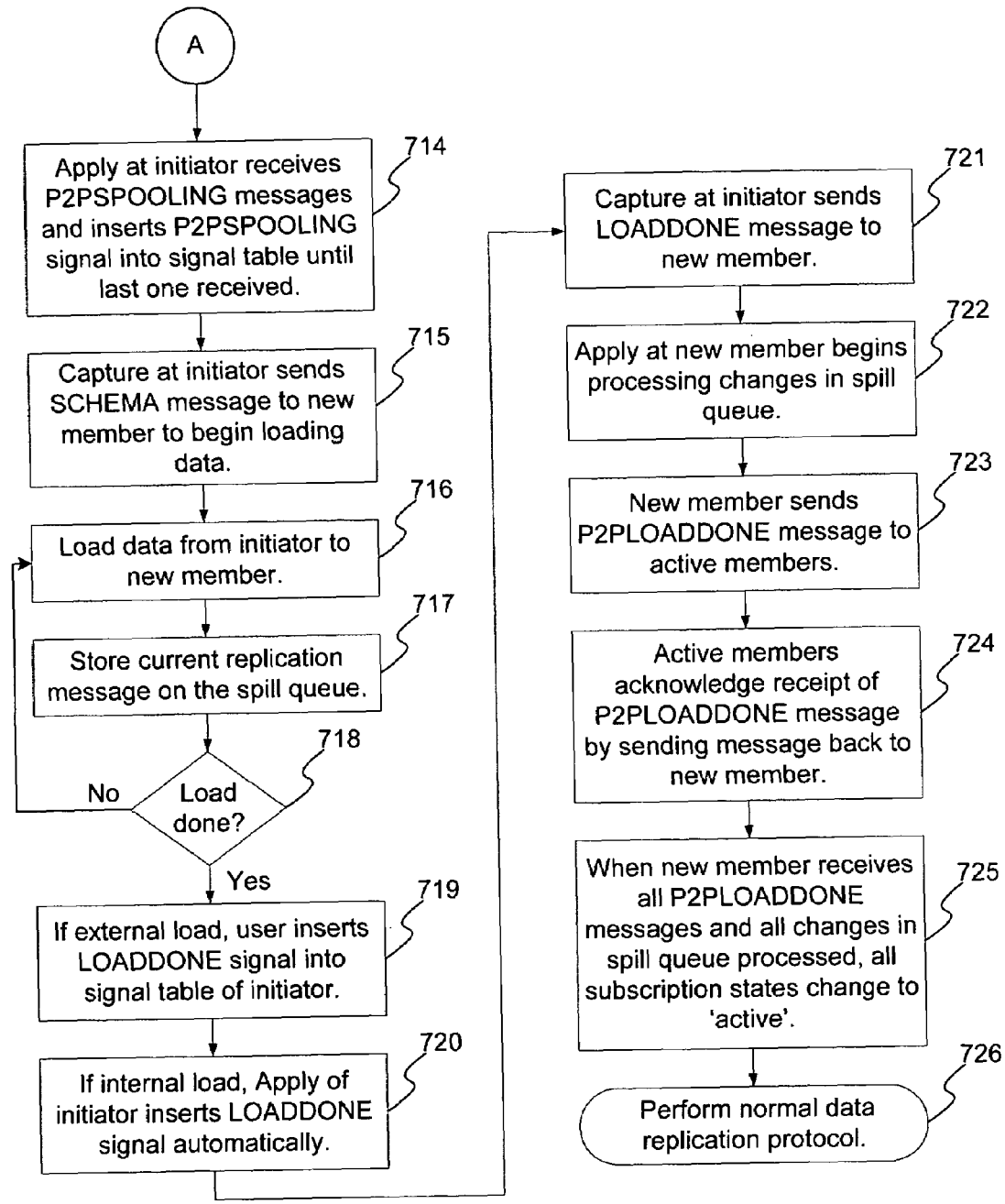
FIG. 7 (con't)

PEER-TO-PEER REPLICATION MEMBER INITIALIZATION AND DEACTIVATION

FIELD OF THE INVENTION

The present invention relates to database systems, and more particularly to the asynchronous replication of data in database systems.

BACKGROUND OF THE INVENTION

Data replication in relational or hierarchical databases is increasingly important as databases are deployed more and more in distributed environments. The goal of data replication is to maintain one or more copies of a source object in the database across servers, possibly on different platforms and geographical locations. One method of data replication is log-based asynchronous replication. A database log records all changes to the tables in the database. Changes are captured from the database log outside of a commit scope of the original database transaction.

FIG. 1 illustrates components of a conventional asynchronous replication process. The database system includes a plurality of nodes 10–12, each node being a "member" of a replication group, i.e., a table copy is kept at each of these nodes 10–12. At each node 10–12 is a Capture program ("Capture") and an Apply program ("Apply"). The Capture and the Apply each maintain control tables at the node. Control tables are database tables used to store all replication information persistently. They are read and updated by Capture and Apply. The node at which changes are made is the source node. The node at which the changes are to be replicated is the target node. Message queues 41–43 is the mechanism used for transporting messages between the nodes 10–12.

During the replication process, Capture reads the database log for committed changes at the source node. The database log contains the source table and row that was changed, the type of operation, the column data type information, the data value after the change for insert and update operations, and the data value before the change for delete and update operations. These changes are then formatted into messages and sent to the message queues to the target node. Upon delivery to the message queue, Apply retrieves the messages and applies the changes to the target table. In the illustrated system, changes are allowed to be initiated at any table copy. This type of replication has been variously called "multi-master", "peer-to-peer", and "update anywhere" data replication.

The propagation of changes made to one table copy may be synchronous or asynchronous to the original change. Synchronous propagation makes changes at all table copies as part of the same transaction that initiated the original changes. Synchronous change propagation requires that the database management systems maintaining all or most table copies be active and available at the time of the change. Also, synchronous change propagation introduces substantial messaging and synchronization costs at the time of the original changes. Asynchronous propagation copies the original changes to the other table copies in separate transactions, subsequent to the completion of the transaction initiating the original changes. Thus, asynchronous change propagation is sometimes more desirable due to its savings in overhead costs.

Before asynchronous replication of data can begin, the replication group of member nodes is first initialized. Also, occasionally, new members are to be added to the replication group or an existing member is to be removed from the replication group. The challenge is to provide these functionalities without significantly and adversely affecting performance.

Accordingly, there exists a need for a method and system for member initialization to and deactivation from an asynchronous data replication group in a database system. The method and system should allow new members to be added to the replication group or existing members removed from the replication group, without requiring the halting of the asynchronous replication of data. The performance advantages of asynchronous replication should still be realized during member initialization or deactivation. The present invention addresses such a need.

SUMMARY OF THE INVENTION

A method and system for member initialization to and deactivation from an asynchronous data replication group in a database system is disclosed. The method and system allows new members to be added to the replication group or existing members to be removed from the replication group, without requiring the halting of the asynchronous replication of data. The performance advantages of asynchronous replication are still realized during member initialization or deactivation.

DETAILED DESCRIPTION

The present invention provides a method and system for member initialization to and deactivation from an asynchronous data replication group in a database system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 10 in conjunction with the discussion below.

Figure 1:
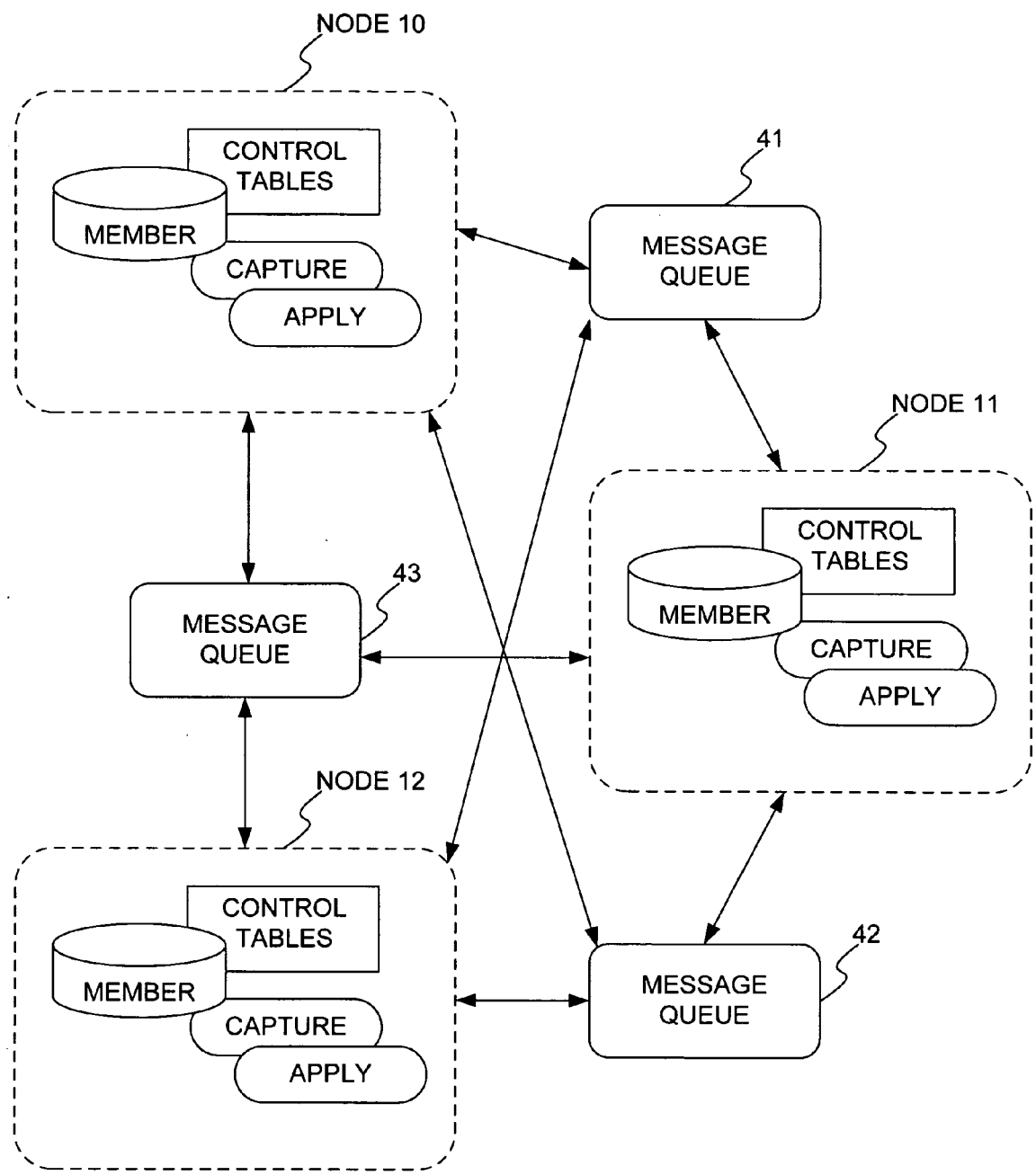
FIG. 1 illustrates components of a conventional asynchronous replication process.
Figure 2:
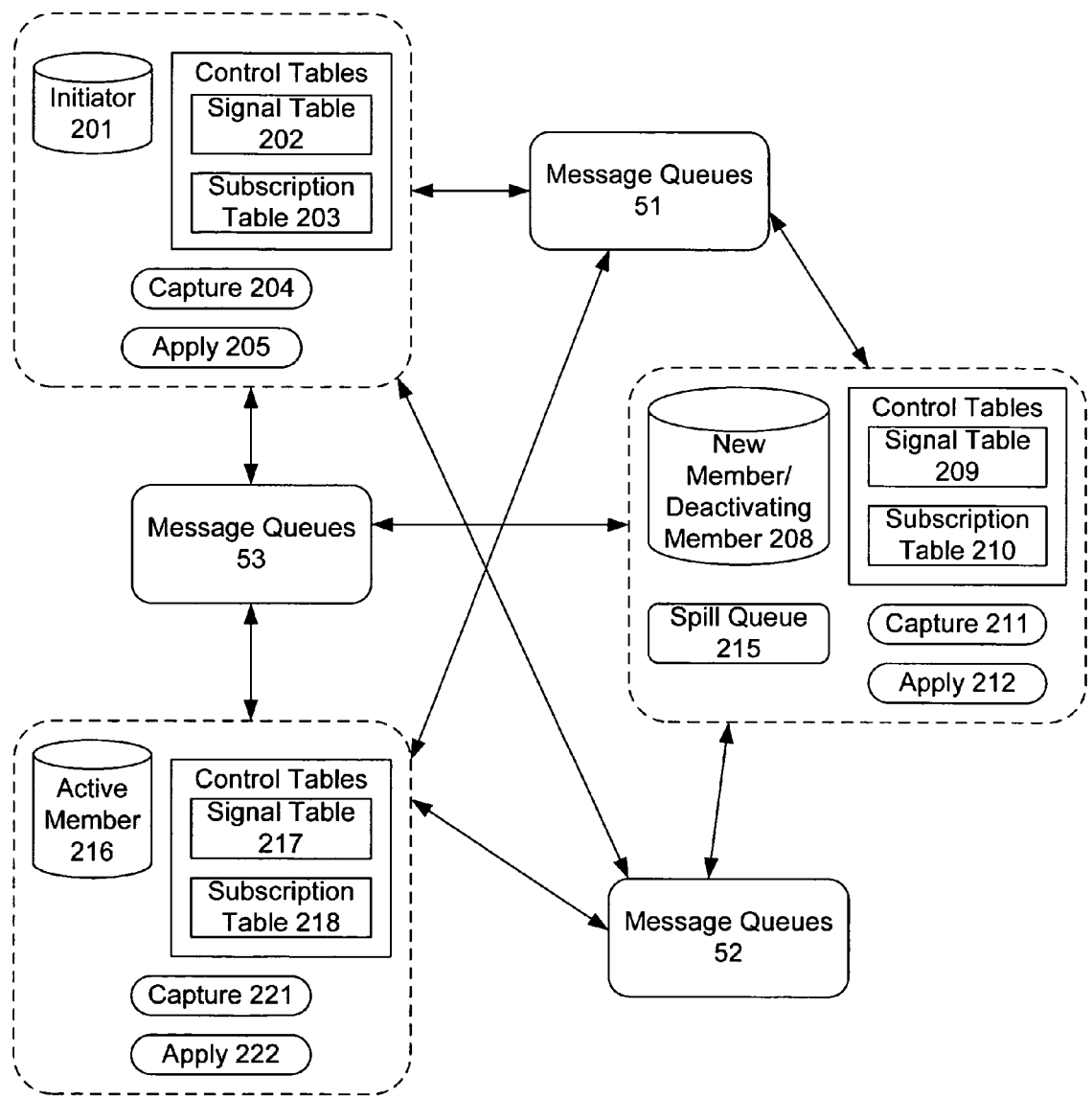
FIG. 2 illustrates an embodiment of a database system that initializes new members and deactivates existing members from an asynchronous data replication group in accordance with the present invention.

FIG. 2 illustrates an embodiment of a database system that initializes new members and deactivates existing members from an asynchronous data replication group in accordance with the present invention. The system first comprises one active member. This active member is assigned the role of an "initiator" 201. The member to be initialized is the "new member" 208. The member to be deactivated is the "deactivating member". If there are other members of the replication group, then each is an "active member" 216. In this embodiment, a "member" is a table, however, members can also be a database, a server, or some other entity containing tables.

At each member node is a Capture program ("Capture"), an Apply program ("Apply"), and control tables. The control tables comprise a signal table and a subscription table, as well as many other tables. The signal table is used specifically for user operations. A user inserts signals into the signal table to control replication activities. Capture retrieves the signal from the signal table and performs the corresponding actions. As a result, a control message is sent to a message queue to notify Apply at a target node about the operation. The message is then transmitted to a message queue at the target node. When Apply retrieves the message from Capture, it will in turn perform appropriate actions on its subscriptions, tables, or queues, in order to complete the requested operation. This is the primary mechanism for Capture and Apply to communicate.

A "subscription" is a mapping of a source table to a target table using a send queue and a receive queue. A send queue is a queue on the source node used by Capture to publish transactions that it has captured. A receive queue is a queue on the target node used by Apply to receive transactions from Capture. Capture writes transactions from the source table onto the send queue in the form of messages. They are then transmitted by a queue manager (not shown) to the receive queue on the Apply node. Then Apply retrieves the messages and applies the changes to the target table. Subscriptions are defined in the subscription table of the control tables for Apply. There is a subscription ID associated with each subscription. Since there are numerous components involved, replication has to be fault tolerant and be able to recover from error. This is particularly true in peer-to-peer replication where the configuration is more complex. The approach used in this embodiment is to associate a state with a subscription.

When a subscription state changes, Capture sends a corresponding control message to inform Apply. Apply will then act accordingly to the change. Table 1 below illustrates the subscription states used in Capture in an embodiment of the present invention.

TABLE 1

Subscription States in Capture

| State | Description |
|---|---|
| I (Inactive) | Subscription is inactive |
| L (Loading) | Base table for this subscription is being loaded |
| A (Active) | Subscription is active, changes to the base table are being captured and sent |
| T (P2PINIT) | Peer-to-peer subscription is being initialized |
| G (P2PSUBSTOPPING) | Peer-to-peer subscription is being deactivated |

Table 2 below illustrates the subscription states used in Apply in the embodiment of the present invention.

TABLE 2

Subscription States in Apply

| State | Description |
|---|---|
| I (Inactive) | Subscription is inactive |
| L (Internal Loading) | Subscription is being loading internally |
| E (External Loading) | Subscription is being loading externally |
| D | Subscription has finished invoking the specified load utility and is ready to send LOADDONE message to Capture (internal loading only) |
| F (FinalCatchUp) | Subscription is now applying changes from the spill queue |
| T (Terminating) | Subscription is terminating because of an error |
| A (Active) | Subscription is active, changes are being applied |

In accordance with the present invention, while a member is being initialized or deactivated, replication activities are not interrupted among the other members in order to attain and insure convergence of all table copies to the same state. The other members in the replication group are to acknowledge the initialization or deactivation of a member, and preferably, with the validation of subscription attributes and compatibilities.

Figure 3:
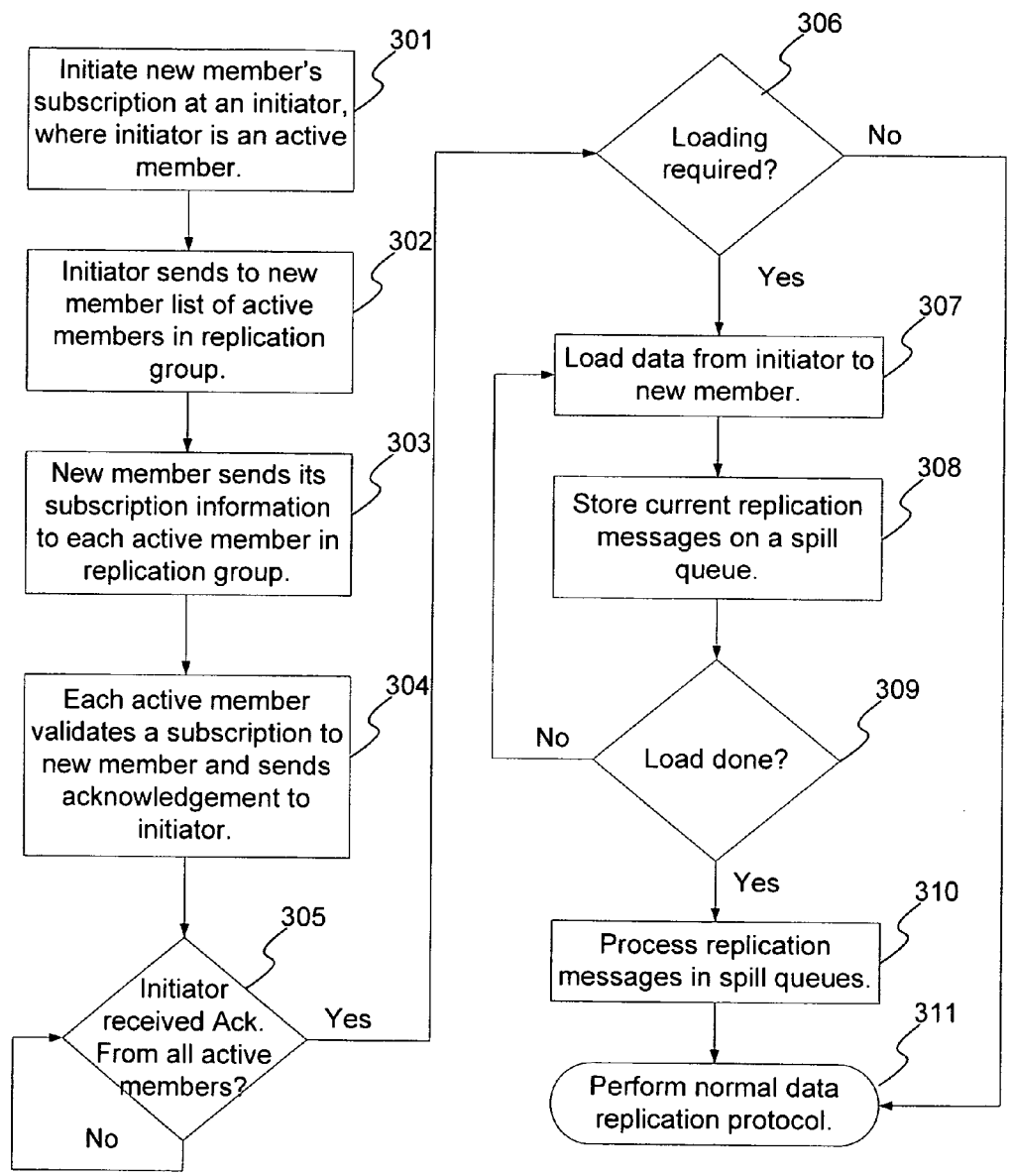
FIG. 3 is a flowchart illustrating an embodiment of a method for initializing a member of an asynchronous data replication group in a database system in accordance with the present invention.

FIG. 3 is a flowchart illustrating an embodiment of a method for initializing a member of an asynchronous data replication group in a database system in accordance with the present invention. Referring to both FIGS. 2 and 3, first, a subscription for a new member 208 is initiated at an initiator 201, via step 301. The initiator 201 is an active member in the replication group. The initiator 201 then sends to the new member 208 a list of the active members in the replication group, via step 302. Next, the new member 208 sends its subscription information to each active member 216 in the replication group, via step 303. Each active member 216 validates a subscription to the new member 208 and sends an acknowledgement to the initiator 201 of receipt of the new member's subscription information, via step 304. The initiator 201 tracks the acknowledgements received from active members 216. When the initiator 201 has received acknowledgements from all of the active members in the replication group, via step 305, it is determined if loading of data into the new member 208 is required, via step 306. Loading is required if the initiator 201 is not an empty table but contains data.

If loading is required, the data is loaded from the initiator 201 to the new member 208, via step 307. In this embodiment, any active member in the replication group can be designated as the initiator 201, with loading being performed only from the initiator 201. While the data is being loaded, any current replication messages from the other active members 216 in the replication group is stored in one or more spill queues, via step 308. A spill queue is a queue separate from the receive queue. In this embodiment, a spill queue is created at the new member for each active members in the replication group. Replication messages from the active members 216 are stored in the respective spill queue but not yet applied to the new member 208. Once the loading is done, via step 309, the replication messages in the spill queues are processed, via step 310, i.e., applied to the new member 208. Once the messages in the spill queue are processed, the normal data replication protocol is performed from that point forward, via step 311. The spill queues allow new members to be added to the replication group without requiring the halting of the asynchronous replication of data between the existing members.

The initialization of a new member into a replication group is further described below and with reference to FIGS. 4 through 7.

During initialization, Capture and Apply running on all nodes in the replication group coordinate with each other in adding a new member node. Capture will send control messages to Apply on another node, while Apply will insert signals for the Capture on the same node.

To start replication in a group of more than two members, two of the members are started first. Then, other members are added to the group one at a time. Initially, all of the members in a replication group are in an 'inactive' state. Then, a new member can be added in by assigning one of the active members the role of initiator and initiating the initialization of the new member there.

Table 3 below illustrates the subscription attributes used in this embodiment:

TABLE 3

| Subscription Attributes | |
|---|---|
| Attribute | Description |
| subtype | Subscription type: 'P' for Peer-to-peer |
| Source_node | Node number for which changes are coming from |
| target_node | Node number for which changes are going to |
| subgroup | Name of the subscription group that the subscription belongs to |
| group_members | A list of active member nodes during initialization |

All subscriptions in a subscription/replication group at a particular node are defined in the same set of control tables. In this embodiment, initially, there are 'inactive' subscriptions for the whole replication group.

In addition to the regular signals, Table 4 below illustrates signals used in this embodiment:

TABLE 4

| Signals in Capture | | | |
|---|---|---|---|
| SIGNAL_SUBTYPE | SIGNAL_INTPUT_IN | Inserted For Message | Usage |
| P2PNEW2MEMB | name of subscription to member node, initiator, new_node, load phase | P2PJOINUS | Inserted at the new node to activate the subscription from the new node to a member with the indicated load phase in the SCHEMA message |
| P2PMEMB2NEW | name of subscription to new node, initiator, role, load phase | SCHEMA | Inserted only at an existing member node which is not the initiator to activate the member-to-new subscription with indicated load phase in the SCHEMA message |
| P2PMEMB2INIT | name of subscription to initiator, new_node | SCHEMA | Inserted only at an existing member node which is not the initiator to tell the initiator that this member node is spooling changes to the new node. |
| P2PSPOOLING | name of subscription to new node, member_node | SCHEMA/ P2PSPOOLING | Inserted at the initiator to inform Capture that a member is spooling changes to the new node |

When Capture receives these signals, it first validates its subscriptions' attributes in the control tables for consistency. It then sends control message(s) in response to the signals, if necessary. Table 5 below illustrates control messages used in this embodiment:

TABLE 5

Control Messages Used In Initialization

| Name | Attributes | Sent For Signal | Usage |
|---|---|---|---|
| SCHEMA | All subscription attributes | P2PNEW2MEMB P2PMEMB2NEW P2PSPOOLING (last one) | Informs other members to start the subscription |
| P2PJOINUS | subscription name, source_node, target_node, load phase, subscription type, group_members | CAPSTART | Informs the new member of the other members in the group, including the initiator |
| P2PSPOOLING | subscription name, new_node | P2PMEMB2INIT | Informs the initiator that the sender is spooling changes to the new node |
| P2PLOADDONE | subscription ID, role | P2PLOADDONE | Informs the member that load has been completed |

When Apply receives these control messages, it first validates its subscriptions' attributes in the control tables for consistency and deduces its role in the subscription group during initialization. It then inserts corresponding signal(s) in the signal table in response to the control messages, if necessary.

In this specification, sig.<attribute> is used to denote an attribute in a signal; msg.<attribute> is used to denote an attribute in a control message; and subs.<attribute> is used to denote an attribute in a subscription.

Figure 4:
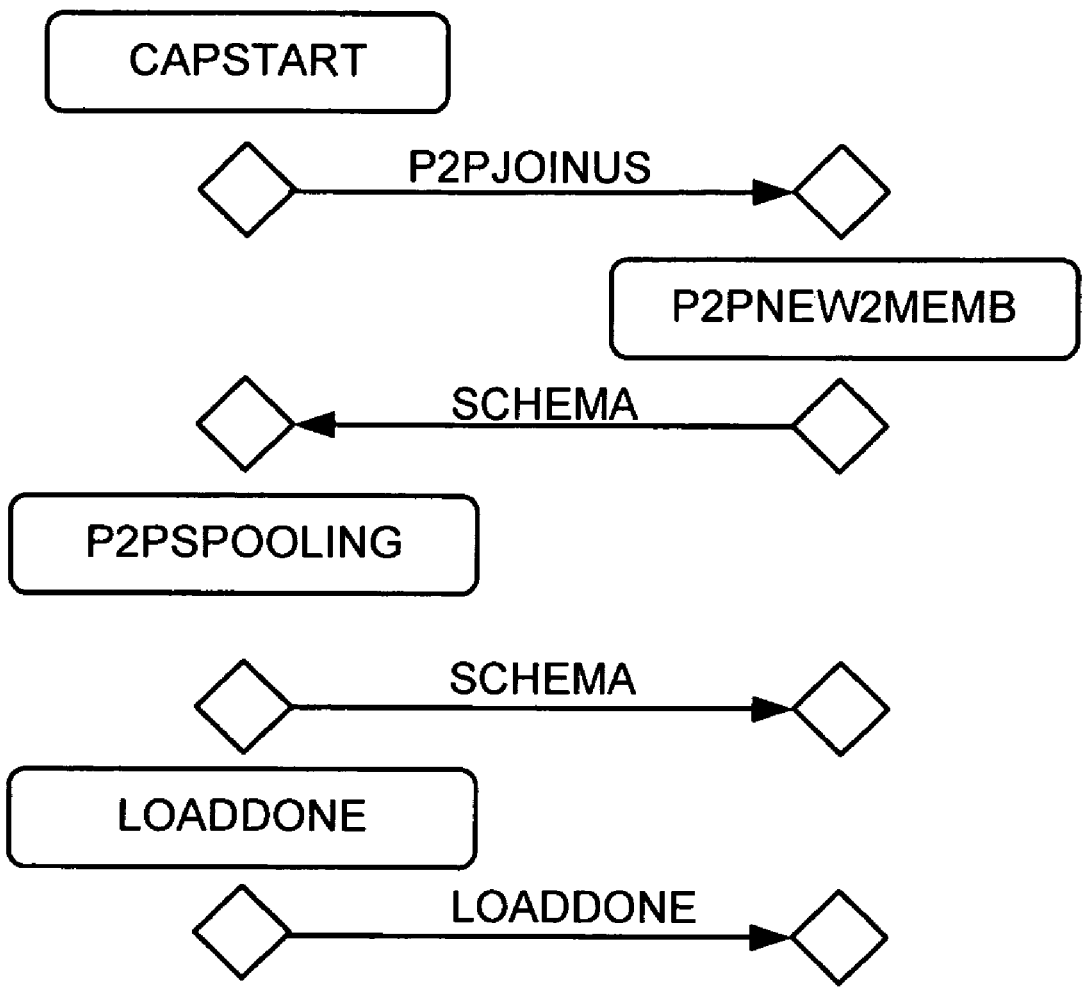
FIG. 4 illustrates the signals and messages asserted during the initializing of the first two members into an asynchronous data replication group in a database system in accordance with the present invention.
Figure 5:
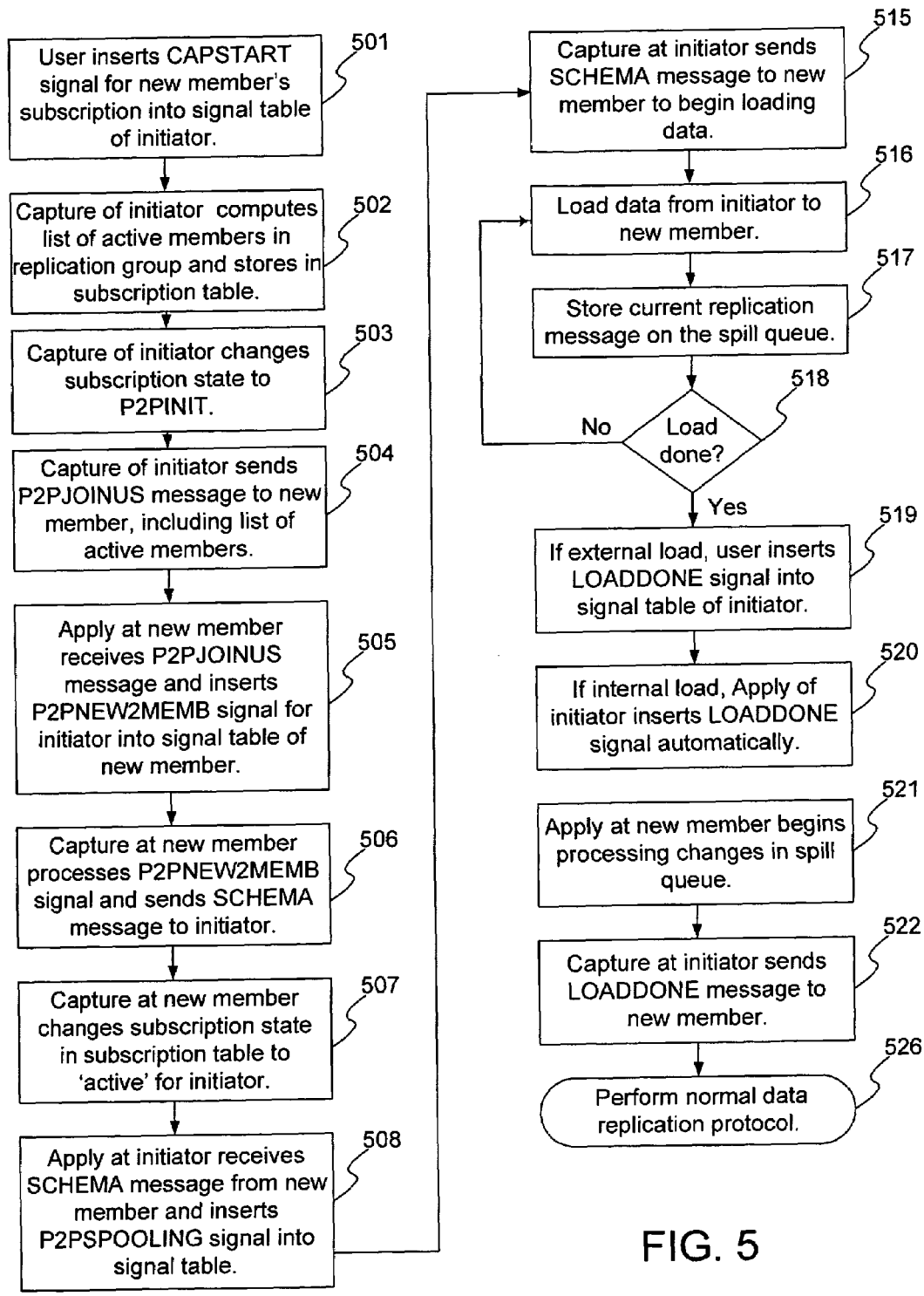
FIG. 5 is a flowchart illustrating an embodiment of the method for initializing the first two members into the replication group in a database system in accordance with the present invention.

FIG. 4 illustrates the signals and messages asserted during the initializing of the first two members into an asynchronous data replication group, while FIG. 5 is a flowchart illustrating an embodiment of the method for initializing the first two members into the replication group in a database system in accordance with the present invention. Assume that the initiator 201 is the only active member in the replication group, and new member 208 is to be initialized into the group. Referring to both FIGS. 4 and 5, first, a user inserts the CAPSTART signal for the new member's subscription into the signal table 202 of the initiator 201, via step 501. In this embodiment, in response to the CAPSTART signal, Capture 204 first validates the new member's subscription attributes. The validation includes the following checks:

Subscription exists;
sub.state is 'inactive';
sub.subtype is 'P';
subs.group_members is null (empty)
Find the corresponding Apply subscription and checks that its state is 'inactive' and it has the correct subs.source_node and subs.target_node and subs.subgroup values;
For all 'active' Capture subscriptions in the subgroup for the same source table:
 All subscriptions have the same subs.source_node;
 Collect list of subs.target_node;
 There are no duplications of subs.target_node among Capture subscriptions;
subs.group_members is null (otherwise implies initialization of another member is in progress with this node as initiator);
Finds matching Apply subscription (same subs.subgroup, Apply subs.target table is Capture source table) and check that subs.source_node=subs.target_node;
There are no Capture or Apply subscriptions in the subgroup for the source table that are in states other than 'inactive' or 'active'.

After the new member's subscription is validated, Capture 204 computes the list of active members in the replication group and stores it in its subscription table 203, via step 502. For the first two members, the initiator 201 is the only active member. Capture 204 of the initiator 201 then changes the subscription state of the new member 208 to P2PINIT, via step 503. Capture 204 of the initiator 201 also sends a P2PJOINUS message to the new member 208, which includes the list of active members (group_members attribute), via step 504. Other attributes in the P2PJOINUS message includes: subscription name, source_node (initiator 201), target_node (new node 208), load phase, and subscription type ('P').

Apply 212 at the new member 208 receives the P2PJOINUS message and validates the new member subscription attributes. The validation includes checking:

Subscription exists;
subs.state is 'inactive';
subs.subtype is 'P';
subs.source_node=msg.target_node, and subs.target_node=msg.source_node;
There exists Capture subscriptions in the subgroup for the target table with the subs.target_node in msg.group_members, and these subscriptions are 'inactive', have null subs.group_members, and have subs.source_node=msg.target_node.;
There exists Apply subscriptions in the subgroup for the target table with subs.source_node in msg.group_members, and these subscriptions are 'inactive', have null subs.group_members and have subs.target_node=msg.target_node;
There are no duplications of subs.source_node among Apply subscriptions in the subgroup for the target table;

There are no duplications of subs.target_node among Capture subscriptions in the subgroup of the target table;

There are no other subscriptions in the subgroup for the target table that are not inactive.

Once validated, Capture 211 inserts a P2PNEW2MEMB signal for the initiator 201 into the signal table 209 of the new member 208, via step 505. In this embodiment, the P2PNEW2MEMB signal includes the subscription name, initiator (initiator), new node (new_node), and load_phase attributes.

Capture 211 at the new member 208 processes the P2PNEW2MEMB signal by first validating the subscription by checking:

Subscription is 'inactive';
subs.subtype is 'P';
subs.source_node=the signal new_node;
subs.group_members is null.

Then, the Capture 211 sends a SCHEMA message to the initiator 201, via step 506. Capture 211 at the new member 208 also changes the subscription state in the subscription table 210 to 'active' for the initiator 201, via step 507. In this embodiment, the attributes of the SCHEMA message includes subscription name, initiator (sig.initiator), new_node (sig.new_node), load_phase (sig.load_phase), as well as other attributes.

Apply 205 at the initiator 201 receives the SCHEMA message from the new member 208, and validates the subscription by checking:

Subscription exists, is 'inactive', subs.subtype of 'P', subs.source_node=msg.target_node and subs.target_node=msg.source_node;

The sub.group_members is empty for all Capture subscriptions in subgroup;

There is an 'inactive'Capture subscription to the new member with the correct subs.source_node and subs.target_node.

Apply 205 then inserts the P2PSPOOLING signal into its signal table 202, via step 508. If loading is required, Capture 204 at the initiator 201 sends the SCHEMA message to the new member 208 to begin loading the data, via step 515. The data is then loaded from the initiator 201 to the new member 208, via step 516. During loading, current replication messages from the initiator are stored on a spill queue, via step 517. When the loading is done, via step 518, if it was an external load, the user inserts the LOADDONE signal into the signal table 202 of the initiator 201, via step 519. If it was an internal load, then the Apply 205 of the initiator 201 automatically inserts the LOADDONE signal, via step 520.

The Apply 212 at the new member 208 then begins processing the replication message in the spill queue, via step 521, to the new member 208. Capture 204 at the initiator 201 also sends the LOADDONE message to the new member 208, via step 522. Once all the replication messages in the spill queue are processed, the normal data replication protocol is performed from that point forward, via step 526.

Figure 6:
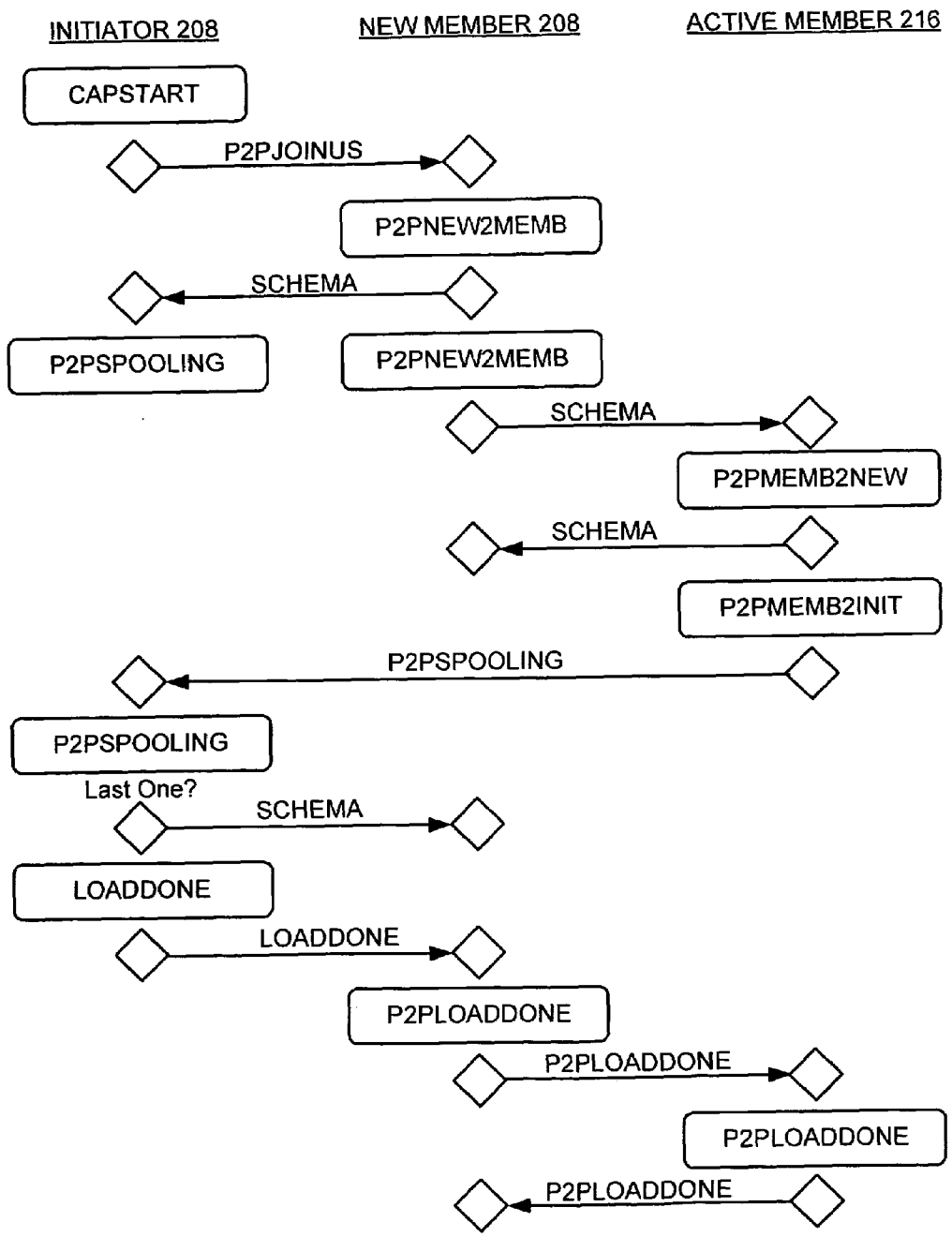
FIG. 6 illustrates the signals and messages in initializing a third or subsequent member into the asynchronous data replication group in a database system in accordance with the present invention.
Figure 7:
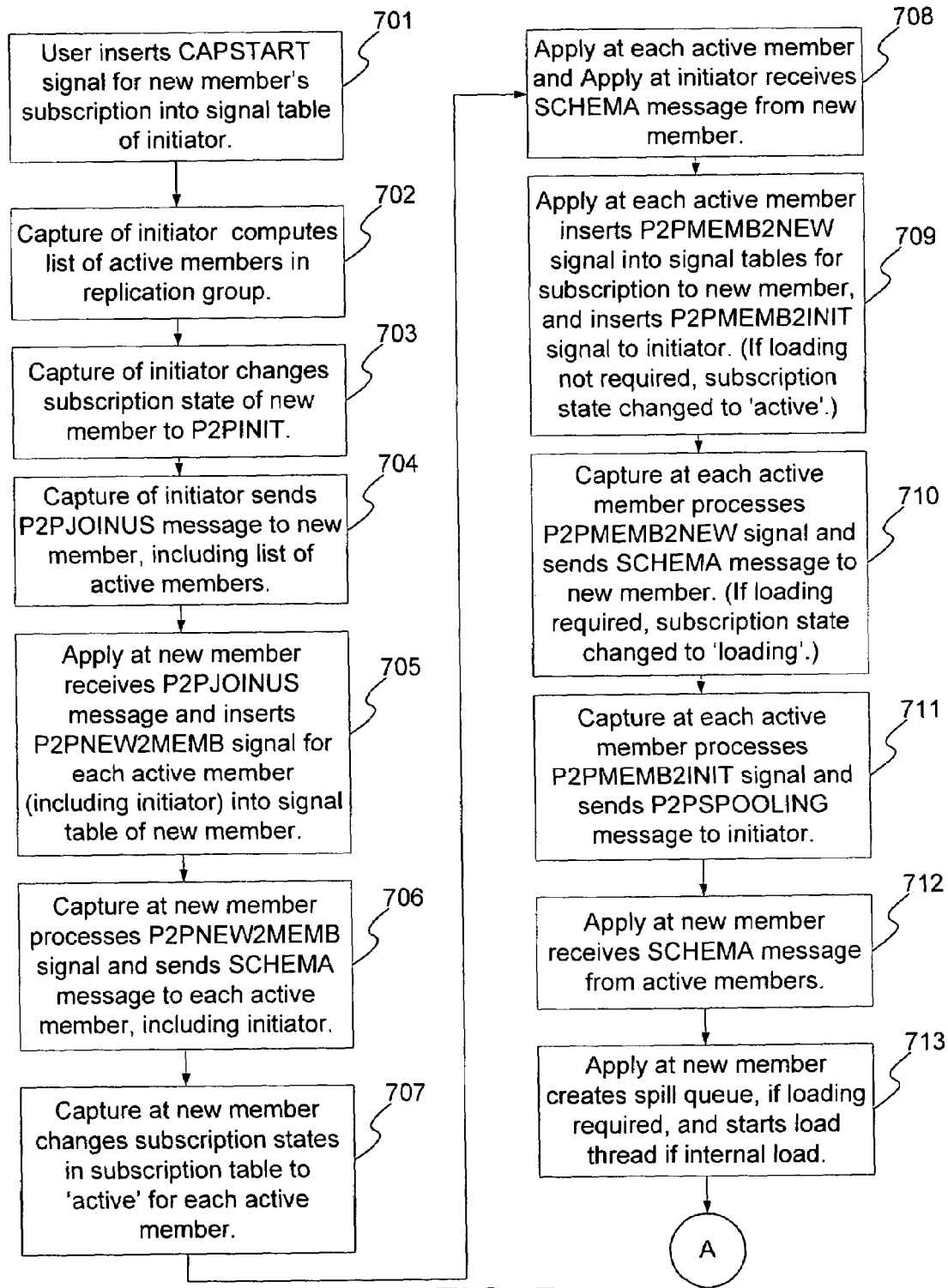
FIG. 7 is a flowchart illustrating an embodiment of the method for initializing the third or subsequent member into the asynchronous data replication group in a database system in accordance with the present invention.

FIG. 6 illustrates the signals and messages in initializing a third or subsequent member into the asynchronous data replication group, while FIG. 7 is a flowchart illustrating an embodiment of the method for initializing the third or subsequent member into the asynchronous data replication group in a database system in accordance with the present invention. Assume that the initiator 201 and the active member 216 are the active members in the replication group, and new member 208 is to be initialized into the group. Referring to both FIGS. 6 and 7, first a user inserts the CAPSTART signal for the new member's subscription into the signal table 202 of the initiator 201, via step 701. Capture 204 of the initiator 201 validates the new member's subscription, as described above. Capture 204 then computes the list of active members in the replication group and stores the list as the subs.group_members attribute, via step 702. Here, the list contains the initiator 201 and the active member 216. Capture 204 of the initiator 201 also changes the subscription state of the new member 208 to P2PINIT, via step 703. Capture 204 of the initiator 201 next sends a P2PJOINUS message to the new member 208, including the list of active members (group_members attribute), via step 704. The other attributes of the message includes subscription name, source_node(initiator), target_node(new_node), load phase, and subscription type ('P').

Apply 212 at the new member 208 receives the P2PJOINUS message and validates it, as described above. Apply 212 then inserts the P2PNEW2MEMB signal for each active member, including the initiator 201, into its own signal table 209, via step 705. In this case, a P2PNEW2MEMB signal is inserted for the active member 216 and includes the subscription name, initiator (initiator), new node (new_node), and load_phase attributes, for each Capture subscription in the subgroup for the target table with source_node=this node, and target_node in the msg.group_members (initiator node included). Next, Capture 211 processes the P2PNEW2MEMB signal, including subscription validation, as described above, and sends a SCHEMA message to each active member, including the initiator 201, via step 706. Capture 211 also changes the subscription states in the subscription table 210 to 'active' for each active member, via step 707.

Apply 222 at each active member 216 and Apply 205 at the initiator 201 receive the SCHEMA messages from the new member 208, via step 708. Subscription validation is performed, as described above, except here, for active members that are not the initiator 201, there is an additional check that there is an 'active'Capture subscription in subgroup to msg.initiator. Apply 222 at each active member 216 that's not the initiator 201 then inserts a P2PMEMB2NEW signal into its signal tables 217 for the subscription to the new member 208, via step 709, and inserts a P2PMEMB2INIT signal to the initiator 201.

Capture 221 at each active member 216 that's not the initiator 201 performs validation in response to the P2PMEMB2NEW signal. The validation includes checking that the subscription is 'inactive', subs.subtype is 'P', and subs.load_phase=msg.load_phase. Capture 221 at each active member 216 (except initiator 201) then sends a SCHEMA message to the new member 208. Attributes of the SCHEMA message includes: subscription name, initiator (sig.initiator), new_node(subs.target_node), load_phase(sig.load_phase), as well as other attributes. The return of the SCHEMA message to the new member 208 is an acknowledgement to the new member 208 that an active member has received the subscription information for the new member 208. If loading is required, the subscription state for the new member's subscription at the active member is changed to 'loading'. If loading is not required, then the subscription state is changed to 'active'.

Capture 221 at each active member 216 also processes the P2PMEMB2INIT signal by sending a P2PSPOOLING message to the initiator 201, via step 711. The P2PSPOOLING messages from the active members serve as acknowledgements to the initiator 201 that an active member has received the subscription information for the new member 208. The initiator 201 collects the acknowledgements and tracks whether a P2PSPOOLING message has been received from each active member in the replication group. In this embodiment, the tracking is performed by using the group_member attribute (list of active members) stored in the subscription table 201, per step 702, as a bit-map. As the initiator 201 receives a P2PSPOOLING message from an active member in group_member, its bit is toggled. When all bits have been toggled, all acknowledgements have been received by the initiator 201.

When Apply 212 at the new member 208 receives the SCHEMA message from an active member 216, via step 712, it validates the message by checking that the subscription exists and that subs.source_node=msg.target_node and subs.target_node=msg.source_node. If loading is required (msg.load_phase is not 'N'), Apply 212 at the new member 208 creates a spill queue for each active member, via step 713. The subscription state is updated to 'A' or 'E' or 'L', depending on msg.load_phase. If the load is an internal load (msg.new_node=subs.target_node, msg.initiator=subs.source_node and msg.loadPhse='I'), the load thread is started.

In the meantime, Apply 205 at the initiator 201 continues to collect P2PSPOOLING messages from the active members. Once the last one has been received, Apply 205 at the initiator 201 inserts a P2PSPOOLING signal into its signal table 202, via step 714. If no loading is required, then the initialization of the new member 208 is completed, and normal data replication protocol is performed from that point forward, via step 726.

If loading is required, Capture 204 sends a SCHEMA message to the new member 208 to begin loading data, via step 715. The data is then loaded from the initiator 201 to the new member 208, via step 716. During loading, current replication messages from each active member are stored on the respective spill queue, via step 717. Once the loading is done, via step 718, if it was an external load, the user inserts a LOADDONE signal into the signal table 202 of the initiator 201, via step 719. If it was an internal load, Apply 205 of the initiator 201 inserts the LOADDONE signal automatically, via step 720. Capture 204 then sends a LOADDONE message to the new member 208, via step 721. Apply 212 at the new member 208 then begins processing the replication messages in the spill queues, via step 722. Apply 212 also sends a P2PLOADDONE message to each active member 216, except for the initiator 201, via step 723. The active members 216 acknowledge receipt of the P2PLOADDONE message by sending the message back to the new member 208, via step 724. When the new member 208 receives the P2PLOADDONE message from all of the active members, and all replication messages in the spill queues have been processed, all subscription states are changed to 'active', via step 725. The initialization of the new member 208 into the replication group is complete, and the normal data replication protocol is then performed from that point forward, via step 726.

If any errors occur at any point in the initialization of a new member, the deactivation will be performed to stop the new member. For example, if a message fails a validation at any point, a P2PCAPSTOP signal will be sent to the new member to deactivate all subscriptions from existing members to the new member. Apply at the new member will put P2PSUBSTOP signals on all the subscriptions whether they are 'active' or 'inactive'. This allows subscriptions with pending signals to be deactivate also.

The deactivation of a member from an asynchronous data replication group is described further below with reference to FIGS. 8 through 10.

Figure 8:
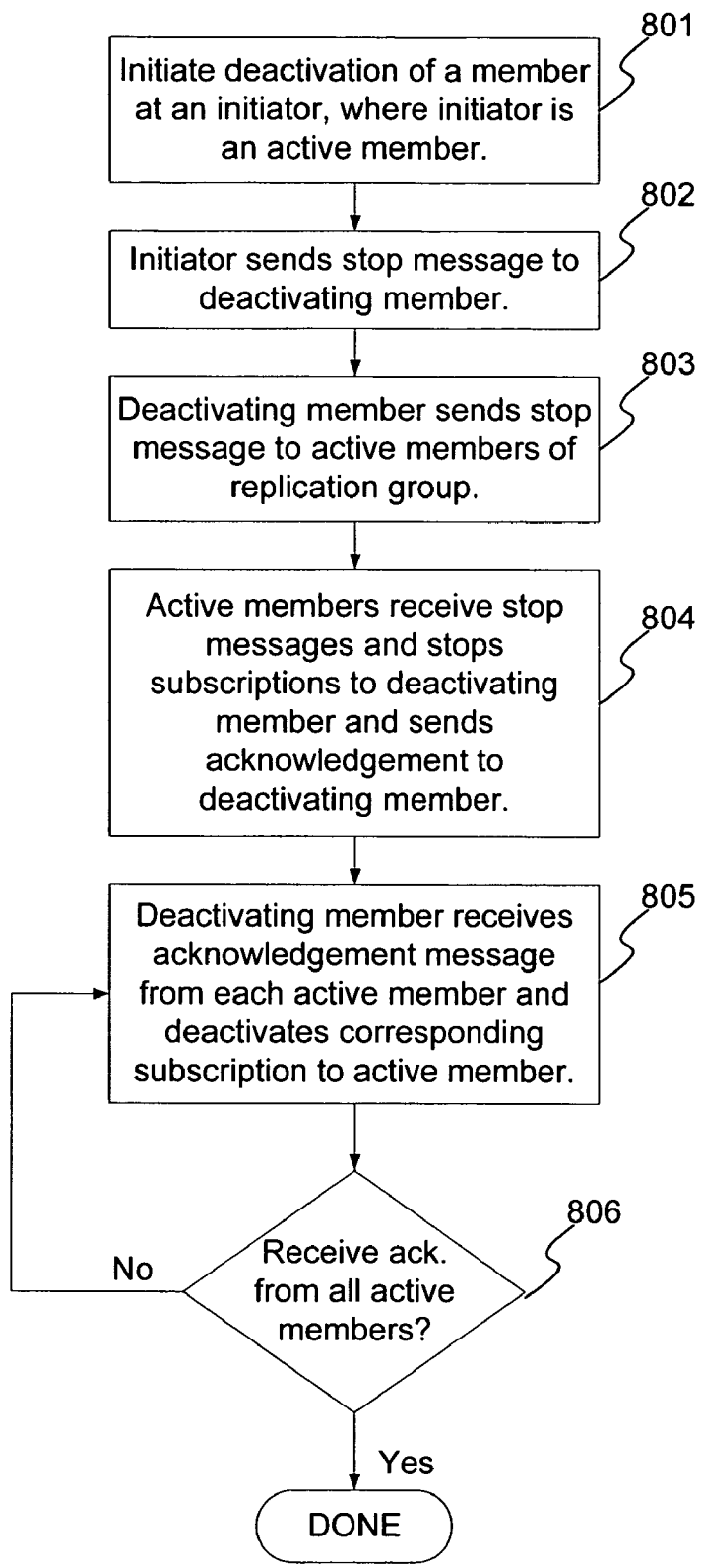
FIG. 8 is a flowchart illustrating an embodiment of a method for deactivating a member from an asynchronous data replication group in a database system in accordance with the present invention.

FIG. 8 is a flowchart illustrating an embodiment of a method for deactivating a member from an asynchronous data replication group in a database system in accordance with the present invention. First, the deactivation of a member is initiated at an initiator, where the initiator is an active member of the replication group, via step 801. In response, the initiator sends a stop message to the deactivating member, via step 802. The deactivating member sends the stop message to other active members of the replication group, via step 803. The active members receive the stop messages and stops their subscriptions to the deactivating member and sends an acknowledgement to that member, via step 804. The deactivating member receives the acknowledgement message from each active member and deactivates the corresponding subscription to the active member, via step 805. Once acknowledgements have been received from all of the active members, via step 806, the member is effectively deactivated from the replication group. During deactivation, the asynchronous replication of data between the existing active members are not halted.

Figure 9:
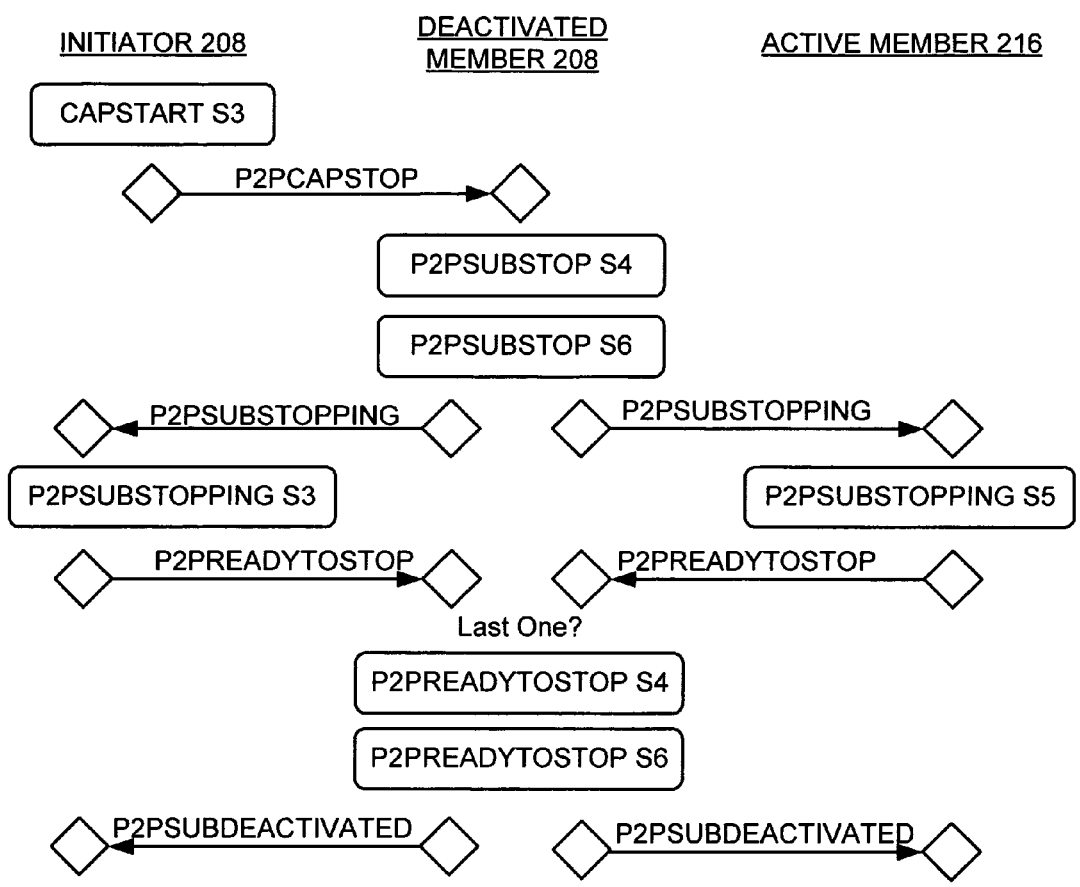
FIG. 9 illustrates the signals and message in deactivating a member from an asynchronous data replication group in a database system in accordance with the present invention.
Figure 10:
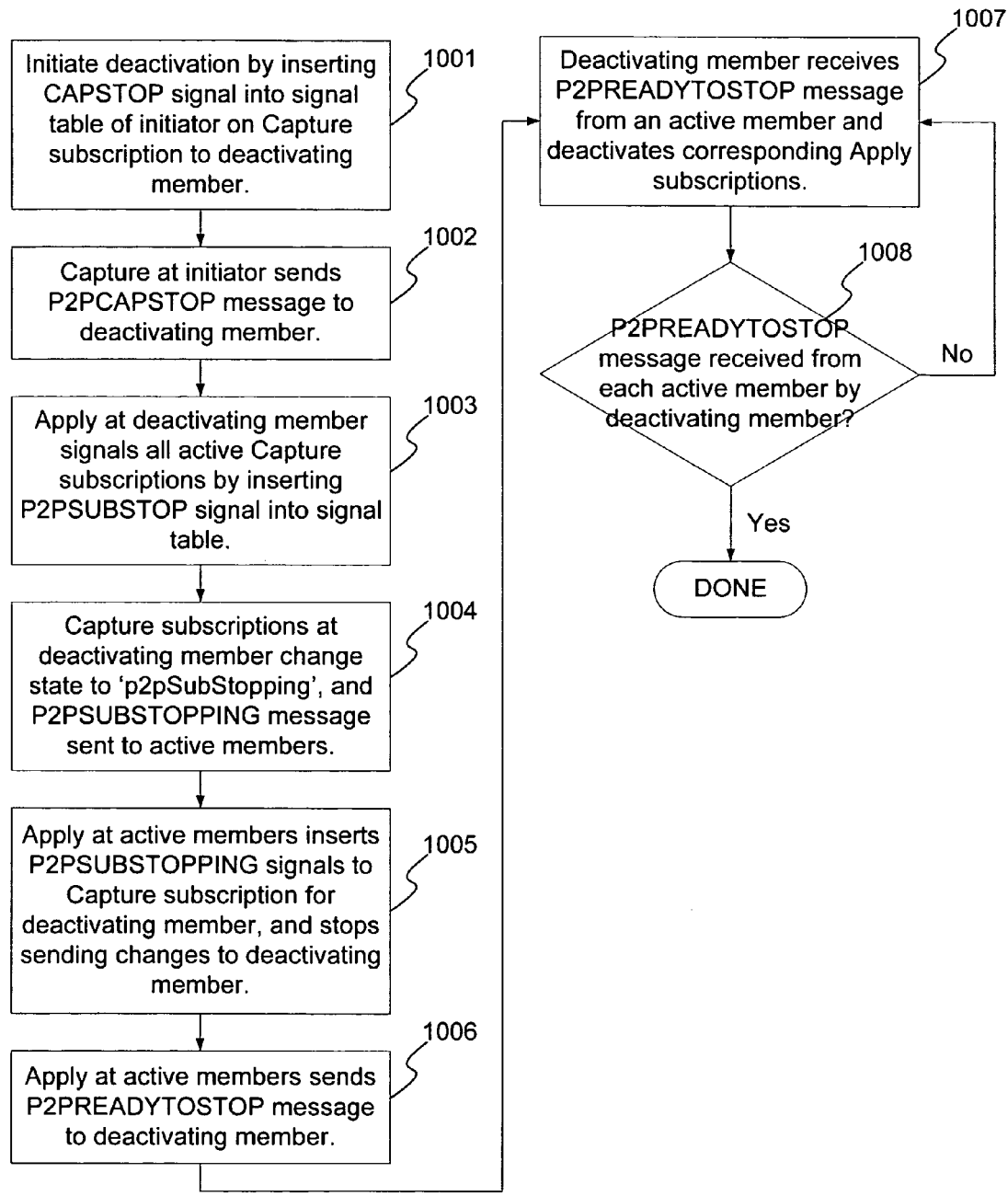
FIG. 10 is a flowchart illustrating in more detail the method for deactivating the member from the asynchronous data replication group in a database system in accordance with the present invention.

FIG. 9 illustrates the signals and message in deactivating a member from an asynchronous data replication group, while FIG. 10 is a flowchart illustrating in more detail the method for deactivating the member from the asynchronous data replication group in a database system in accordance with the present invention. Assume that member 201 is assigned the role of initiator 201, member 216 is an active member, and member 208 is to be deactivated. Referring to both FIGS. 9 and 10, first, the deactivation of member 208 is initiated by inserting a CAPSTOP signal into the signal table 202 of the initiator 201 on the Capture subscription to the deactivating member 208, via step 1001. In response, Capture 204 at the initiator 201 sends a P2PCAPSTOP message to the deactivating member 208, via step 1002. Upon receipt of the P2PCAPSTOP message, Apply 212 at the deactivating member 208 signals all active Capture subscriptions by inserting a P2PSUBSTOP signal into its signal table 209 for each of these subscriptions, via step 1003. The state of the Capture subscriptions at the deactivating member 208 is then changed to 'p2pSubStopping', and a P2PSUBSTOPPING message is sent to each active member 216, via step 1004. Upon receiving the P2PSUBSTOPPING message, Apply 222 at each active member 216 inserts a P2PSUBSTOPPING signal to the Capture subscription for the deactivating member 208, and stops sending replication messages to the deactivating member 208, via step 1005. Apply 222 at each active member also sends a P2PREADYTOSTOP message to the deactivating member 208, via step 1006. The deactivating member 208 to be deactivated receives the P2PREADYTOSTOP message from an active member and deactivates its corresponding Apply subscription in the subscription table 210, via step 1007. Once a P2PREADYTOSTOP message has been received from each active member by the deactivating member 208, via step 1008, the deactivation of the member 208 is complete.

A method and system for member initialization to and deactivation from an asynchronous data replication group in a database system has been disclosed. The method and system allows new members to be added to the replication group or existing members to be removed from the replication group, without requiring the halting of the asynchronous replication of data. The performance advantages of asynchronous replication are still realized during member initialization or deactivation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for member initialization to an asynchronous data replication group in a database system, the method comprising:
   initiating subscription for a new member by an initiator, wherein the initiator is an active member in the replication group;
   sending a list of active members in the replication group from the initiator to the new member;
   sending subscription information for the new member to each active member in the replication group;
   validating a subscription to the new member at each active member and sending an acknowledgement to the initiator; and
   determining that an acknowledgement from each active member has been received by the initiator.

2. The method of claim 1 further comprising:
   determining that a loading of data onto the new member is required;
   loading the data from the initiator to the new member;
   storing current replication messages from the active members onto at least one spill queue;
   determining that the loading of the data has completed; and
   applying the replication messages stored on the at least one spill queue to the new member.

3. The method of claim 2, wherein determining that a loading of data onto the new member is required further comprises:
   creating a spill queue for each active member.

4. The method of claim 2, wherein determining that the loading of the data has completed comprises:
   sending a load done message from the initiator to the new member.

5. The method of claim 2, wherein applying the replication messages stored on the at least one spill queue to the new member comprises:
   sending a load done message to each active member by the new member;
   sending an acknowledgement of receipt of the load done message by each active member to the new member; and
   determining that the acknowledgement of receipt has been received from each active member by the new member.

6. The method of claim 2, further comprising:
   performing asynchronous data replication between the active members in the replication group, wherein the replication group includes the new member.

7. The method of claim 1, wherein initiating subscription for a new member comprises:
   inserting a signal into a signal table of the initiator to initiate the subscription for the new member.

8. The method of claim 1, wherein sending a list of active members in the replication group comprises:
   computing the list of active members in the replication group by the initiator;
   changing a subscription state for the new member to 'initializing' at the initiator; and
   sending the list of active members from the initiator to the new member.

9. The method of claim 1, wherein sending subscription information for the new member comprises:
   receiving the list of active members from the initiator by the new member;
   sending the subscription information for the new member from the new member to each active member in the list of active members; and
   changing a subscription state at the new member for each active member to 'active'.

10. The method of claim 1, wherein validating a subscription to the new member at each active member and sending an acknowledgement to the initiator comprises:
    receiving the subscription information for the new member by each active member from the new member;
    changing a subscription state for the subscription to the new member to 'active' at each active member, if no loading of data into the new member is required;
    changing the subscription state for the subscription to the new member to 'loading' at each active member, if loading of data into the new member is required;
    informing the initiator that changes to the new member is spooling by each active member; and
    informing the new member that the subscription information for the new member has been received by each active member.

11. The method of claim 1 wherein determining that an acknowledgement from each active member has been received by the initiator comprises:
    collecting messages from the active members by the initiator, wherein each message informs the initiator that the sending active member is spooling changes to the new member; and
    determining that messages from all active members in the replication group have been received by the initiator.

12. The method of claim 1, further comprising:
    performing asynchronous data replication between the active members in the replication group, wherein the replication group includes the new member.

13. A method for member deactivation from an asynchronous data replication group in a database system, the method comprising:
    initiating deactivation of a member of the replication group by an initiator, wherein the initiator is an active member in the replication group;
    sending a stop message from the initiator to the deactivating member;
    sending a stop message from the deactivating member to each active member in the replication group;
    receiving the stop message from the deactivating member by each active member;
    stopping a subscription to the deactivating member by each active member;
    sending an acknowledgement of receipt of the stop message to the deactivating member by each active member;
    receiving the acknowledgement of receipt of the stop message by the deactivating member from an active member and deactivating a corresponding subscription to the sending active member at the deactivating member; and
    determining that the acknowledgement of receipt of the stop message from each active member has been received by the deactivating member.

14. The method of claim 13 wherein initiating deactivation of a member of the replication group comprises:
    initiating deactivation of the deactivating member by inserting a stop signal into a signal table of the initiator.

15. The method of claim 13 wherein sending a stop message from the deactivating member to each active member in the replication group further comprises:
   changing a subscription state for each active member at the deactivating member to 'stopping'.

16. A system, comprising:
   an initiator node, wherein the initiator node is an active member of an asynchronous data replication group;
   a new member node, wherein the new member node is initialized into the replication group by:
      initiating a subscription for the new member node by the initiator node,
      sending a list of active member nodes in the replication group from the initiator node to the new member node,
      sending subscription information for the new member to each active member node in the replication group,
      validating a subscription to the new member node at each active member node and sending an acknowledgement to the initiator node, and
      determining that an acknowledgement from each active member node has been received by the initiator node.

17. A system, comprising:
   an initiator node, wherein the initiator node is an active node of an asynchronous data replication group; and
   a deactivating node, wherein the deactivating node is to be deactivated from the replication group by:
      initiating deactivation of the deactivating node by the initiator node,
      sending a stop message from the initiator node to the deactivating node,
      sending a stop message from the deactivating node to each active node in the replication group,
      receiving the stop message from the deactivating node by each active node,
      stopping a subscription to the deactivating node by each active node,
      sending an acknowledgement of receipt of the stop message to the deactivating node by each active node,
      receiving the acknowledgement of receipt of the stop message by the deactivating node from an active node and deactivating a corresponding subscription to the sending active node at the deactivating node, and
      determining that the acknowledgement of receipt of the stop message from each active node has been received by the deactivating node.

18. A computer readable medium with program instructions, tangibly stored thereon, for member initialization to an asynchronous data replication group in a database system, the program instructions comprising instructions for:
   initiating subscription for a new member by an initiator, wherein the initiator is an active member in the replication group;
   sending a list of active members in the replication group from the initiator to the new member;
   sending subscription information for the new member to each active member in the replication group;
   validating a subscription to the new member at each active member and sending an acknowledgement to the initiator; and
   determining that an acknowledgement from each active member has been received by the initiator.

19. The computer readable medium of claim 18, further comprising instructions for:
   determining that a loading of data onto the new member is required;
   loading the data from the initiator to the new member;
   storing current replication messages from the active members onto at least one spill queue;
   determining that the loading of the data has completed; and
   applying the replication messages stored on the at least one spill queue to the new member.

20. The computer readable medium of claim 19, wherein the instructions for determining that a loading of data onto the new member is required further comprises instructions for:
   creating a spill queue for each active member.

21. The computer readable medium of claim 19, wherein the instructions for determining that the loading of the data has completed comprises instructions for:
   sending a load done message from the initiator to the new member.

22. The computer readable medium of claim 19, wherein the instructions for applying the replication messages stored on the at least one spill queue to the new member comprises instructions for:
   sending a load done message to each active member by the new member;
   sending an acknowledgement of receipt of the load done message by each active member to the new member; and
   determining that the acknowledgement of receipt has been received from each active member by the new member.

23. The computer readable medium of claim 19, further comprising instructions for:
   performing asynchronous data replication between the active members in the replication group, wherein the replication group includes the new member.

24. The computer readable medium of claim 18, wherein the instructions for initiating subscription for a new member comprises instructions for:
   inserting a signal into a signal table of the initiator to initiate the subscription for the new member.

25. The computer readable medium of claim 18, wherein the instructions for sending a list of active members in the replication group comprises instructions for:
   computing the list of active members in the replication group by the initiator;
   changing a subscription state for the new member to 'initializing' at the initiator; and
   sending the list of active members from the initiator to the new member.

26. The computer readable medium of claim 18, wherein the instructions for sending subscription information for the new member to each active member in the replication group comprises instructions for:
   receiving the list of active members from the initiator by the new member;
   sending the subscription information for the new member from the new member to each active member in the list of active members; and
   changing a subscription state at the new member for each active member to 'active'.

27. The computer readable medium of claim 18, wherein the instructions for validating a subscription to the new member at each active member and sending an acknowledgement to the initiator comprises instructions for:
   receiving the subscription information for the new member by each active member from the new member;

changing a subscription state for the subscription to the new member to 'active' at each active member, if no loading of data into the new member is required;

changing the subscription state for the subscription to the new member to 'loading' at each active member, if loading of data into the new member is required;

informing the initiator that changes to the new member is spooling by each active member; and informing the new member that the subscription information for the new member has been received by each active member.

28. The computer readable medium of claim 18, wherein the instructions for determining that an acknowledgement from each active member has been received by the initiator comprises instructions for:

collecting messages from the active members by the initiator, wherein each message informs the initiator that the sending active member is spooling changes to the new member; and determining that messages from all active members in the replication group have been received by the initiator.

29. The computer readable medium of claim 18, further comprising instructions for:

performing asynchronous data replication between the active members in the replication group, wherein the replication group includes the new member.

30. A computer readable medium with program instructions, tangibly stored thereon, for member deactivation from an asynchronous data replication group in a database system, the program instructions comprising instructions for:

initiating deactivation of a member of the replication group by an initiator, wherein the initiator is an active member in the replication group;

sending a stop message from the initiator to the deactivating member;

sending a stop message from the deactivating member to each active member in the replication group;

receiving the stop message from the deactivating member by each active member;

stopping a subscription to the deactivating member by each active member;

sending an acknowledgement of receipt of the stop message to the deactivating member by each active member;

receiving the acknowledgement of receipt of the stop message by the deactivating member from an active member and deactivating a corresponding subscription to the sending active member at the deactivating member; and determining that the acknowledgement of receipt of the stop message from each active member has been received by the deactivating member.

31. The computer readable medium of claim 30, wherein the instructions for initiating deactivation of a member of the replication group comprises instructions for:

initiating deactivation of the deactivating member by inserting a stop signal into a signal table of the initiator.

32. The computer readable medium of claim 30, wherein the instructions for sending a stop message from the deactivating member to each active member in the replication group further comprises instructions for:

changing a subscription state for each active member at the deactivating member to 'stopping'.

* * * * *